UNITED STATES PATENT OFFICE.

PAUL DUDEN AND GUSTAV PETERS, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

PROCESS OF PREPARING ACETALDEHYDE FROM ACETYLENE.

14,064. Specification of Reissued Letters Patent. Reissued Feb. 15, 1916.

No Drawing. Original No. 1,151,929, dated August 31, 1915, Serial No. 2,077. Application for reissue filed January 4, 1916. Serial No. 70,283.

*To all whom it may concern:*

Be it known that we, PAUL DUDEN, Ph. D., professor of chemistry, and GUSTAV PETERS, Ph. D., chemist, citizens of the Empire of Germany, residing at Höchst-on-the-Main, Germany, have invented certain new and useful Improvements in the Process of Preparing Acetaldehyde from Acetylene, of which the following is a specification.

In U. S. patent application Ser. No. 2076 filed on the same day herewith we have described a process for preparing acetaldehyde from acetylene in presence of solutions containing mercury, by adding to the liquid of the reaction an oxidizing agent which, on the one hand, impedes the separation of mercury and, on the other hand, is not able under the working conditions employed to oxidize to a considerable extent either the acetylene, or the intermediately produced mercury compounds of acetylene, or the aldehyde. In elaborating this invention, we have found that for the same purpose compounds of hexavalent chromium, such as chromic acid or chromates, are also particularly suitable. When using the same it is advantageous to work in such a manner that the aldehyde produced is continuously removed from the solution of the reaction, for instance by employing temperatures above the boiling point of the acetaldehyde and passing at the same time a current of an excess of acetylene through the absorption vessel.

The following example illustrates our invention: 40 grams of mercury sulfate are dissolved in about two liters of sulfuric acid of 6% strength in a vessel provided with a stirring device, an efficient condenser and a receiver; this solution is heated to about 75° C., while introducing an excess of acetylene, and a small quantity of a solution containing hexavalent chromium is then continuously run into it in such a manner that the maximum absorption of the gas obtainable under the test conditions of temperature, acidity, etc., is continuously maintained. The aldehyde carried along with the current of gas is condensed and collected in the receiver, while the excess of acetylene is reconducted into the absorption vessel by means of a pump.

Having now described our invention, what we claim is:—

1. The process of preparing acetaldehyde from acetylene, which consists in combining acetylene with the elements of water in presence of a mercury compound and a compound of hexavalent chromium.

2. The process of preparing acetaldehyde from acetylene, which consists in combining acetylene with the elements of water in presence of a mercury compound and chromic acid.

PAUL DUDEN.
GUSTAV PETERS.